(12) United States Patent
Yao

(10) Patent No.: US 9,482,808 B2
(45) Date of Patent: Nov. 1, 2016

(54) DISPLAY DEVICE WITH BACKLIGHT MODULE HAVING WHITE AND MONOCHROMATIC LEDS

(71) Applicants: BOE TECHNOLOGY GROUP CO., LTD., Beijing (CN); BEIJING BOE DISPLAY TECHNOLOGY CO., LTD., Beijing (CN)

(72) Inventor: Shulin Yao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 176 days.

(21) Appl. No.: 14/067,146

(22) Filed: Oct. 30, 2013

(65) Prior Publication Data

US 2014/0119053 A1    May 1, 2014

(30) Foreign Application Priority Data

Oct. 30, 2012   (CN) .......................... 2012 1 0425962

(51) Int. Cl.
*G02F 1/13357* (2006.01)
*F21V 8/00* (2006.01)

(52) U.S. Cl.
CPC ........... *G02B 6/0068* (2013.01); *G02B 6/0073* (2013.01)

(58) Field of Classification Search
CPC ................. F21Y 2103/003; F21Y 2113/005; F21V 9/00; F21V 9/08; F21V 11/08; F21V 11/14; F21V 2200/20; G02F 1/133615; G02F 1/133621; G02F 1/133623; G02F 1/133624
See application file for complete search history.

(56) References Cited

U.S. PATENT DOCUMENTS

| | | | | |
|---|---|---|---|---|
| 6,508,564 B1* | 1/2003 | Kuwabara | ............ | G02B 6/0068 362/559 |
| 7,083,302 B2* | 8/2006 | Chen | ......................... | F21K 9/00 257/89 |
| 7,173,383 B2* | 2/2007 | Vornsand | ................ | F21S 4/008 315/291 |
| 7,220,039 B2* | 5/2007 | Ahn | ..................... | G02B 6/0068 362/231 |
| 7,241,040 B2* | 7/2007 | Ahn | ..................... | G02B 6/0068 362/601 |
| 7,293,907 B2* | 11/2007 | Kim | .................. | G02F 1/133603 257/E25.02 |
| 7,476,016 B2* | 1/2009 | Kurihara | ............ | H05B 33/0821 362/231 |
| 7,857,457 B2* | 12/2010 | Rutherford | ............ | G03B 21/14 353/31 |
| 7,905,613 B2* | 3/2011 | Watanabe | ............ | G02B 6/0028 362/23.08 |
| 8,297,826 B2* | 10/2012 | Murakoshi | ........... | G02B 6/0068 362/612 |
| 8,888,351 B2* | 11/2014 | Lee | .................... | G02F 1/133615 362/612 |
| 2002/0175632 A1* | 11/2002 | Takeguchi | ........... | G02B 6/0068 315/169.1 |
| 2006/0245209 A1* | 11/2006 | Jeong | ................ | G02F 1/133609 362/612 |

\* cited by examiner

*Primary Examiner* — Ismael Negron
(74) *Attorney, Agent, or Firm* — Ladas & Parry LLP

(57) ABSTRACT

A backlight module includes a light guide plate and a light bar disposed on the light guide plate, with white light sources and monochromatic light sources having at least one color of N primary colors wherein N is greater than or equal to 3. A display device includes the backlight module, and a plurality of sub-pixels of different colors, with the width of sub-pixels of the at least one color being less than the width of sub-pixels of other colors.

7 Claims, 2 Drawing Sheets

US 9,482,808 B2

DISPLAY DEVICE WITH BACKLIGHT MODULE HAVING WHITE AND MONOCHROMATIC LEDS

CROSS REFERENCE TO RELATED APPLICATIONS

This application claims priority from Chinese National Application No. 201210425962.2 filed on Oct. 30, 2012, the contents of which are incorporated herein by reference.

FIELD OF THE INVENTION

The present invention relates to displays, in particular to a backlight module and a display device.

BACKGROUND

Liquid-crystal display (LCD) devices have become the mainstream display device and are mainly applied to LCDs for computers, large-scale LCD TVs and the like. As LCD panels per se do not emit light spontaneously, the display effect can only be achieved when the LCD panels are used together with backlights. In the early stage of the development of the LCD devices, the mainstream backlights adopt cold cathode fluorescent lamps (CCFL). But CCFLs have insufficient mechanical strength and poor color reproducibility, and do not meet the environmental requirements as they contain mercury. In recent years, CCFL backlights have been gradually replaced by light-emitting diode (LED) backlights. As compared with CCFL backlights, LED backlights have the advantages of not containing toxic substances and having high mechanical strength, long service life and the like. As the LED backlights have so many advantages, most display devices used currently adopt LEDs as backlight systems.

Although LED backlights have the above advantages, the color gamut range of the LED backlights is only 70 to 80 percent of the standard color gamut. There is still much room for improvement in color gamut range.

SUMMARY

According to embodiments of the present invention, a backlight module is provided, which comprises a light guide plate and a light bar disposed on the light guide plate, the light bar being provided with white light sources, wherein the light bar is further provided with monochromatic light sources having at least one color of N primary colors, wherein N≥3.

Preferably, the monochromic light sources and the white light sources on the light bar are arranged at intervals.

Preferably, the monochromic light sources are monochromic light sources having one color of the N primary colors.

For example, the monochromic light sources are monochromic light sources having one color of three primary colors.

Preferably, the monochromic light sources are red light sources.

Preferably, both the monochromic light sources and the white light sources are light-emitting diodes.

According to embodiments of the present invention, a display device is also provided, which comprises a backlight module, wherein the backlight module includes a light guide plate and a light bar disposed on the light guide plate; and the light bar is provided with white light sources and monochromic light sources having at least one color of N primary colors, wherein N≥3.

Preferably, the monochromic light sources are monochromic light sources having one color of the N primary colors; and the width of sub-pixels, whose color is the same as that of the monochromic light sources, on the display device is less than that of sub-pixels with other colors.

The monochromic light sources are for example monochromic light sources having one color of three primary colors; and the width of sub-pixels, whose color is the same as that of the monochromic light sources, on the display device is less than that of sub-pixels with the other two colors.

Preferably, the monochromic light sources are red light sources; and the width of red sub-pixels on the display device is less than those of green sub-pixels and blue sub-pixels.

Preferably, the monochromic light sources are red light sources; the width of red sub-pixels on the display device is less than that of green sub-pixels; and the width of the green sub-pixels is less than that of blue sub-pixels.

Preferably, a ratio of the width of the red sub-pixels to that of the green sub-pixels to that of the blue sub-pixels on the display device is 0.8:0.9:1.

BRIEF DESCRIPTION OF THE DRAWINGS

In order to illustrate the technical solution of the embodiment of present invention more clearly, a simply introduction about the drawings of the embodiments will be made in the following, and obviously, the drawings described later relate to only some embodiments of the present invention, rather than limitation to the present invention.

DETAILED DESCRIPTION

Further description will be given below to the preferred embodiments of the present invention with reference to the accompanying drawings and the embodiments. The following embodiments are only used for illustrating the present invention and not intended to limit the scope of the present invention.

Figure 1:
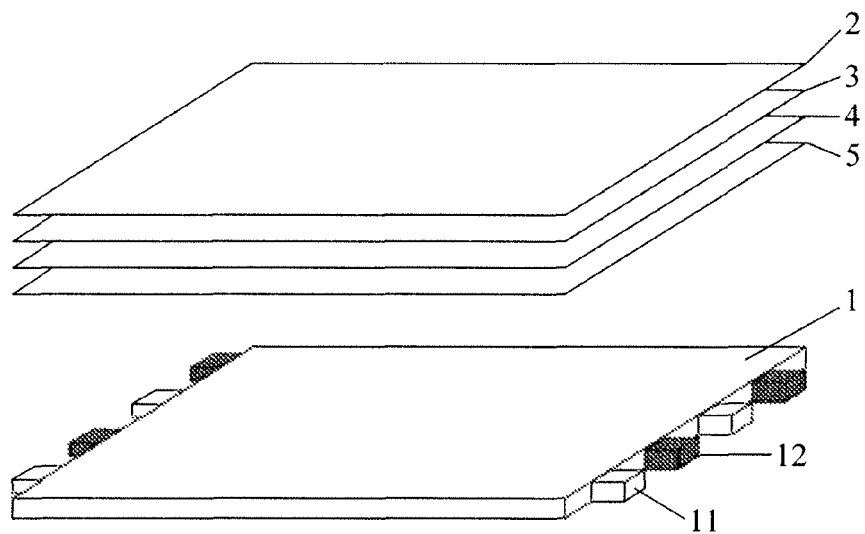
FIG. 1 is a schematic structural view of a backlight module according to the embodiment of the present invention.

As illustrated in FIG. 1, the backlight module according to the embodiment of the present invention comprises a light guide plate 1, a diffusion sheet 2, a prism sheet 3, another prism sheet 4 and a diffusion sheet 5, wherein one LED bar is disposed on either side of the light guide plate 1, respectively; and the LED bars are provided with white light sources 11 (LEDs emitting white light) and monochromic light sources 12 having at least one color of N primary colors (for instance, three primary colors RGB, four primary colors CMYK, or other self-defined color systems). In order to uniformly mix the light sources, the white light sources 11 and the monochromic light sources 12 are arranged at intervals.

Theoretically, the monochromic light sources 12 on the LED bars may have any monochromic colors at the same time. For instance, red light sources and green light sources are provided at the same time. However, in order to avoid color distortion caused by the mixing of a plurality of colors, the monochromic light sources 12 on the LED bars preferably have the same color. The experimental result shows that red is more obvious than blue or green in the aspect of improving the color gamut. Therefore, preferably, the monochromic light sources 12 are red light sources, for instance, LEDs emitting red light.

According to embodiments of the present invention, a display device is further provided which comprises the above-mentioned backlight module. By adoption of the backlight module, the color range which can be displayed by the display device can be widened, that is, the display color gamut can be improved.

Respective sub-pixels on a color filter substrate and an array substrate of the traditional thin-film transistor liquid crystal display (TFT-LCD) have the same sizes as each other. When the monochromic light sources are additionally arranged in the backlight module, the display effect of sub-pixels whose color is the same as that of the monochromic light sources will be enhanced, and thus the phenomenon of color distortion will occur (for instance, the whole display screen is reddish).

In order to avoid the phenomenon of color distortion, the monochromic light sources are monochromic light sources having one color of the N primary colors, namely the monochromic light sources 12 on the LED bars have the same primary color. Meanwhile, the sizes of sub-pixels on the display device are changed, so that the area of sub-pixels, whose color is the same as that of the monochromic light sources, on the display device can be less than that of sub-pixels corresponding to other colors. For instance, the width of the sub-pixels, whose color is the same as that of the monochromic light sources, on the display device is less than that of the sub-pixels corresponding to other colors.

Description will be given below by taking an RGB display device as an example.

The monochromic light sources are monochromic light sources having one color of three primary colors, for instance, red light sources. The width of sub-pixels, whose color is the same as that of the red light sources, on the display device is less than that of sub-pixels corresponding to green and blue. As the color value of green is close to that of red, and red light has a relatively large influence on green light, the width of red sub-pixels is preferably less than that of green sub-pixels, and the width of the green sub-pixels is less than that of blue sub-pixels. The ratio of the width of the red sub-pixels to that of the green sub-pixels to that of the blue sub-pixels can be 0.8:0.9:1.

Figure 2:
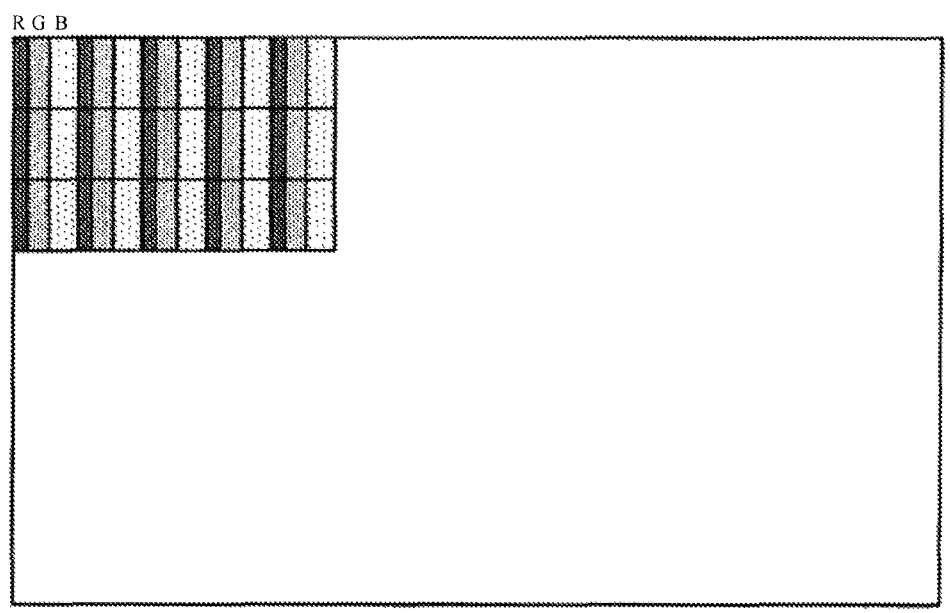
FIG. 2 is a schematic structural view of a color filter for a display device according to the embodiment of the present invention.

FIG. 2 illustrates a color filter structure of the display device according to the present embodiment. The traditional color filter is configured that the sizes of RGB sub-pixels are basically the same. In order to be used together with the backlights designed in the present invention, the color filter structure is preferably improved that the RGB sub-pixels are designed to have different sizes, so that the width of R sub-pixels on a color filter is less than that of G sub-pixels, and the width of the G sub-pixels is less than that of B sub-pixels. For instance, the ratio of the widths of the R, G and B sub-pixels on a color filter is 0.8:0.9:1. Meanwhile, the ratio of the widths of the R, G and B pixel structures on an array substrate is also 0.8:0.9:1.

Figure 3:
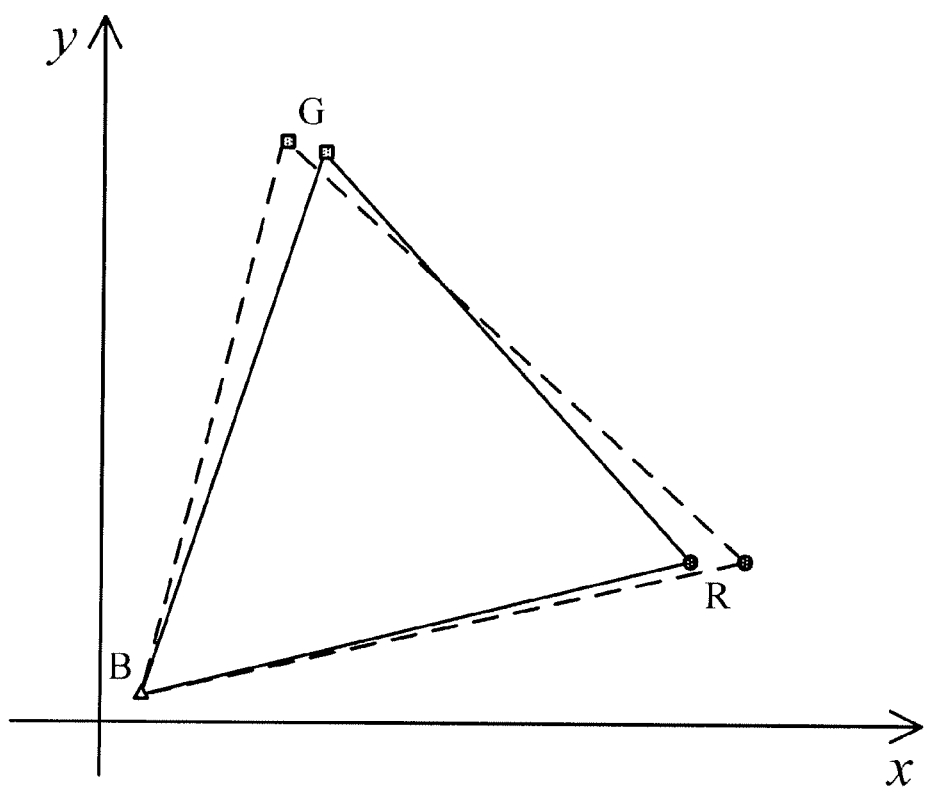
FIG. 3 is a schematic comparison diagram of the color gamut range of the traditional display device and the color gamut range of the display device according to the present invention.

The color range which can be displayed by the display device is traditionally defined as a triangular area encircled by R, G and B color coordinates. The larger the area of the triangle, the wider the color range which can be displayed by the display device. As illustrated in FIG. 3, an area encircled by solid lines indicates the color range which can be displayed by a general display device, and an area encircled by dotted lines indicates the color range which can be displayed by the display device according to the present embodiment with the mixed backlight and the special color filter. As shown in the figure, the red reproducibility of the backlight module provided with red LEDs is higher than that of the general display device, and the color gamut range can be widened.

The display device according to the present invention is not limited to the RGB display device, and can be display devices having other color modes, for instance, CMYK or other self-defined color modes. The difference is that sub-pixel structures on a color filter substrate and an array substrate are accordingly sub-pixel structures of other colors.

The display device according to embodiments of the present invention can be an LCD panel, electronic paper, an organic light-emitting diode (OLED) panel, an LCD TV, an LCD, a digital picture frame, a mobile phone, a tablet PC or any other products or components having the display function.

According to the embodiments of the present invention, the color gamut range of the backlight display system can be improved by incorporating the monochromic light sources having one color of the N primary colors (for instance, three primary colors RGB, four primary colors CMYK or other self-defined color systems) into the LED bars. Moreover, in order to be used together with the backlight, in the display device according to the embodiment of the present invention, the sizes of the sub-pixels are changed so that the display device can not only improve the color gamut range and increase the color reproducibility but also avoid the phenomenon of color distortion.

The foregoing embodiments are provided only for illustrating the present invention and not intended to limit the present invention. It should be understood by those skilled in the art that various modifications, combinations, sub-combinations and alterations may occur depending on design requirements and other factors insofar as they are within the scope of the appended claims or the equivalents thereof.

What is claimed is:

1. A display device, comprising a backlight module and a display panel having an array of pixels, wherein each of the pixels includes sub-pixels with at least red, green and blue colors, and the backlight module includes a light guide plate and a light bar disposed on the light guide plate; and the light bar is provided with white light sources and monochromic light sources having at least one color of N primary colors, N≥3, wherein the monochromic light sources are red light sources; the width of red sub-pixels on the display device is less than that of green sub-pixels; and the width of the green sub-pixels is less than that of blue sub-pixels.

2. The display device according to claim 1, wherein a ratio of the width of the red sub-pixels to that of the green sub-pixels to that of the blue sub-pixels on the display panel is 0.8:0.9:1.

3. The display device according to claim 1, wherein the monochromic light sources and the white light sources on the light bar are arranged at intervals.

4. The display device according to claim 1, wherein the monochromic light sources are monochromic light sources having only one color of the N primary colors.

5. The display device according to claim 1, wherein both the monochromic light sources and the white light sources are light-emitting diodes.

6. The display device according to claim 1, wherein the monochromic light sources are monochromic light sources having only one color of three primary colors.

7. The display device according to claim 6, wherein the monochromic light sources are red light sources.

* * * * *